(12) United States Patent
Favero et al.

(10) Patent No.: US 10,493,906 B2
(45) Date of Patent: Dec. 3, 2019

(54) VEHICLE PUDDLE LAMP ASSEMBLY

(71) Applicant: Ford Global Technologies, LLC, Dearborn, MI (US)

(72) Inventors: Kevin Joseph Favero, Plymouth, MI (US); Michael J. Gardynik, Farmington Hills, MI (US); Steven Frank, Dearborn, MI (US); Kevin A. Gustafson, S. Rockwood, MI (US); Austin Murphy, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/957,351

(22) Filed: Apr. 19, 2018

(65) Prior Publication Data

US 2019/0324362 A1 Oct. 24, 2019

(51) Int. Cl.
| | |
|---|---|
| *B60Q 1/26* | (2006.01) |
| *B60Q 1/32* | (2006.01) |
| *B60Q 1/24* | (2006.01) |
| *B60R 1/12* | (2006.01) |
| *B60Q 1/00* | (2006.01) |

(52) U.S. Cl.
CPC ............... *B60Q 1/323* (2013.01); *B60Q 1/24* (2013.01); *B60Q 1/2665* (2013.01); *B60Q 1/0023* (2013.01); *B60Q 2400/40* (2013.01); *B60Q 2400/50* (2013.01); *B60R 1/1207* (2013.01); *B60R 2001/1223* (2013.01)

(58) Field of Classification Search
CPC ............ B60Q 2400/50; B60Q 2400/40; B60Q 1/2665; B60Q 1/323; F21S 10/007; B60K 2350/2052; B60K 2350/924; B60K 35/00; B60R 11/0229; B60R 1/06; B60R 1/074; B60R 1/12; B60R 1/1207; B60R 2001/1215; B60R 2001/1253; B60R 2011/004; B60R 2011/0085
See application file for complete search history.

(56) References Cited

U.S. PATENT DOCUMENTS

| | | | | |
|---|---|---|---|---|
| 5,672,931 | A * | 9/1997 | Kiss | F21V 13/08 313/44 |
| 7,186,051 | B2 * | 3/2007 | Benedetti | B60R 13/0206 403/329 |
| 7,364,382 | B2 * | 4/2008 | Benedetti | B60R 13/0206 24/297 |
| 8,764,256 | B2 | 7/2014 | Foote et al. | |
| 8,876,343 | B2 | 11/2014 | Murray et al. | |
| 2004/0223805 | A1 * | 11/2004 | Benedetti | B60R 13/0206 403/316 |

(Continued)

FOREIGN PATENT DOCUMENTS

| | | | | |
|---|---|---|---|---|
| CN | 105799607 A | | 7/2016 | |
| JP | WO 2005108165 A1 | * | 11/2005 | ........... G60Q 1/2665 |
| TW | M546331 U | | 8/2017 | |

*Primary Examiner* — Bao-Luan Q Le
(74) *Attorney, Agent, or Firm* — Vichit Chea; Price Heneveld LLP

(57) ABSTRACT

A vehicle puddle lamp assembly is provided herein. The vehicle puddle lamp assembly includes a housing having a housing retainer. A light source is supported by the housing. A cover is removably coupled to a base portion of the housing. An optical member is disposed between the housing and the cover. The optical member may include an image filter thereon. The image filter is configured to form a desired image pattern on a surface proximate the housing.

20 Claims, 5 Drawing Sheets

(56) References Cited

U.S. PATENT DOCUMENTS

| | | | |
|---|---|---|---|
| 2006/0256459 A1* | 11/2006 | Izabel | B60R 11/04 |
| | | | 359/872 |
| 2006/0280554 A1* | 12/2006 | Benedetti | B60R 13/0206 |
| | | | 403/397 |
| 2007/0053195 A1* | 3/2007 | Alberti | B60Q 1/2665 |
| | | | 362/494 |
| 2007/0109807 A1* | 5/2007 | Lynam | B60K 35/00 |
| | | | 362/545 |
| 2008/0191626 A1 | 8/2008 | Salter et al. | |
| 2009/0161379 A1* | 6/2009 | Liesener | B60Q 1/2665 |
| | | | 362/494 |
| 2010/0073949 A1* | 3/2010 | Sato | B60Q 1/007 |
| | | | 362/494 |
| 2012/0134166 A1* | 5/2012 | Asai | B60Q 1/2665 |
| | | | 362/514 |
| 2013/0051040 A1* | 2/2013 | Kracker | B60Q 1/2665 |
| | | | 362/464 |
| 2014/0191859 A1* | 7/2014 | Koelsch | H02J 7/0047 |
| | | | 340/455 |
| 2014/0218212 A1* | 8/2014 | Nykerk | B60Q 1/0023 |
| | | | 340/901 |
| 2014/0218521 A1* | 8/2014 | Tanaka | B60Q 1/24 |
| | | | 348/148 |
| 2014/0320823 A1* | 10/2014 | Ammar | B60R 1/12 |
| | | | 353/13 |
| 2016/0068107 A1* | 3/2016 | Sawada | B60Q 1/0088 |
| | | | 362/540 |
| 2017/0050558 A1 | 2/2017 | Salter et al. | |
| 2017/0066386 A1* | 3/2017 | Sawada | B60R 11/0229 |
| 2017/0210282 A1* | 7/2017 | Rodriguez Barros | G03B 21/00 |
| 2018/0111558 A1* | 4/2018 | Motomiya | B60R 1/074 |
| 2019/0039520 A1* | 2/2019 | Sawada | B60Q 1/24 |

* cited by examiner

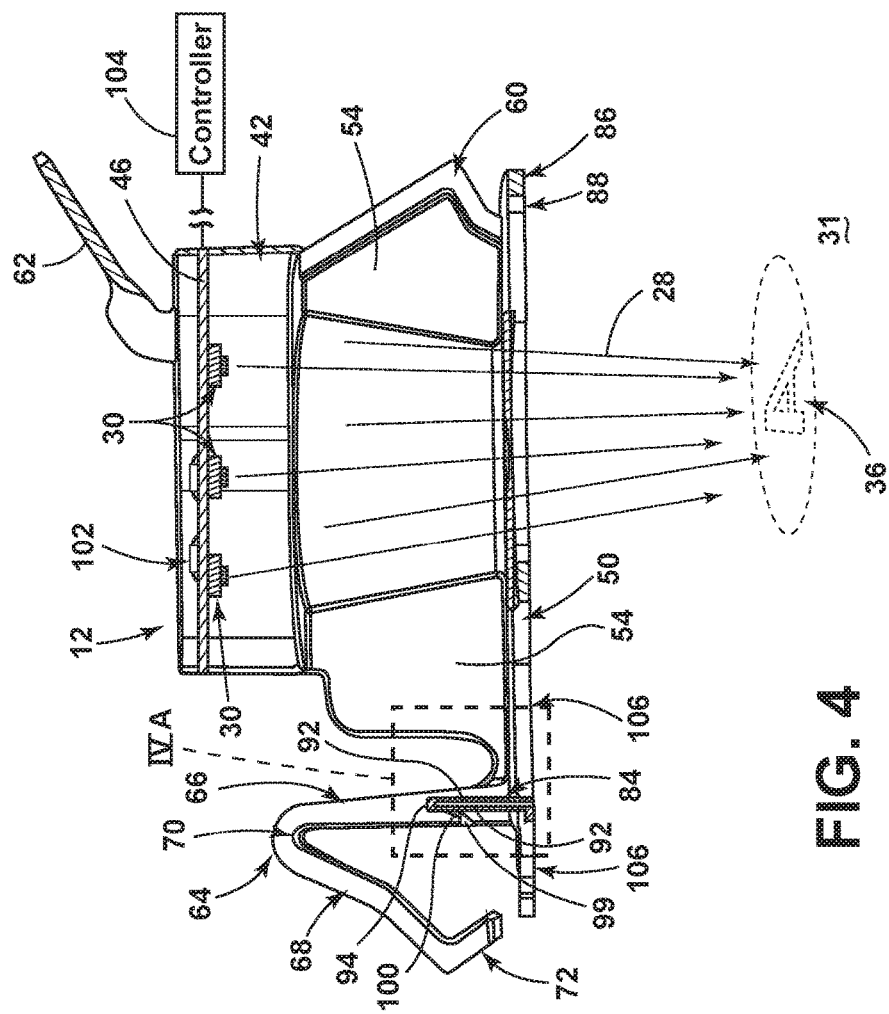
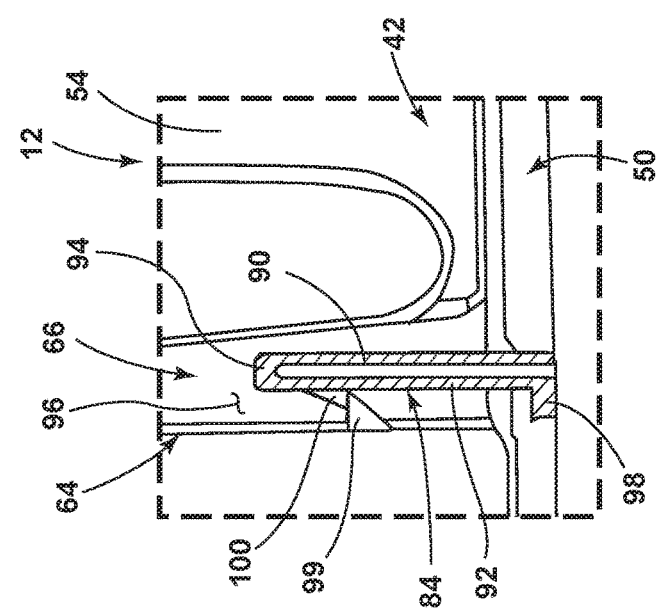
FIG. 4
FIG. 4A

VEHICLE PUDDLE LAMP ASSEMBLY

FIELD OF THE INVENTION

The present disclosure generally relates to vehicle lighting assemblies, and more particularly, to vehicle puddle lamp assemblies that may be disposed within an exterior housing.

BACKGROUND OF THE INVENTION

Vehicle lighting applications continue to grow in popularity. Accordingly, a puddle lamp assembly that may be integrated into an exterior housing is provided herein that is operable to provide functional lighting as well as impart a stylistic element to the vehicle.

SUMMARY OF THE INVENTION

According to some aspects of the present disclosure, a vehicle puddle lamp assembly is provided herein. The vehicle puddle lamp assembly includes a housing having a housing retainer. A light source is supported by the housing. A cover is removably coupled to a base portion of the housing. An optical member is disposed between the housing and the cover.

According to some aspects of the present disclosure, a vehicle puddle lamp assembly is provided herein. The vehicle puddle lamp assembly includes a housing having a housing retainer. A light source is supported by the housing. A cover is removably coupled to the housing. The cover includes a cover retainer that is operably coupled to the housing retainer.

According to some aspects of the present disclosure, a vehicle puddle lamp assembly is provided herein. The vehicle puddle lamp assembly includes a housing having a housing retainer and supporting a light source. A cover is removably coupled to the housing. The cover includes a cover retainer at least partially disposed within the housing retainer. An optical member is disposed between the housing and the cover.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a cross-sectional view of the lamp assembly taken along the line IV-IV of FIG. 2 illustrating the cover operably coupled with the housing and the optical member therebetween;

FIG. 4A is an enhanced view of section IVA of FIG. 4 illustrating a cover retainer within a housing retainer, according to some examples;

DETAILED DESCRIPTION OF THE PREFERRED EXAMPLES

Figure 1:
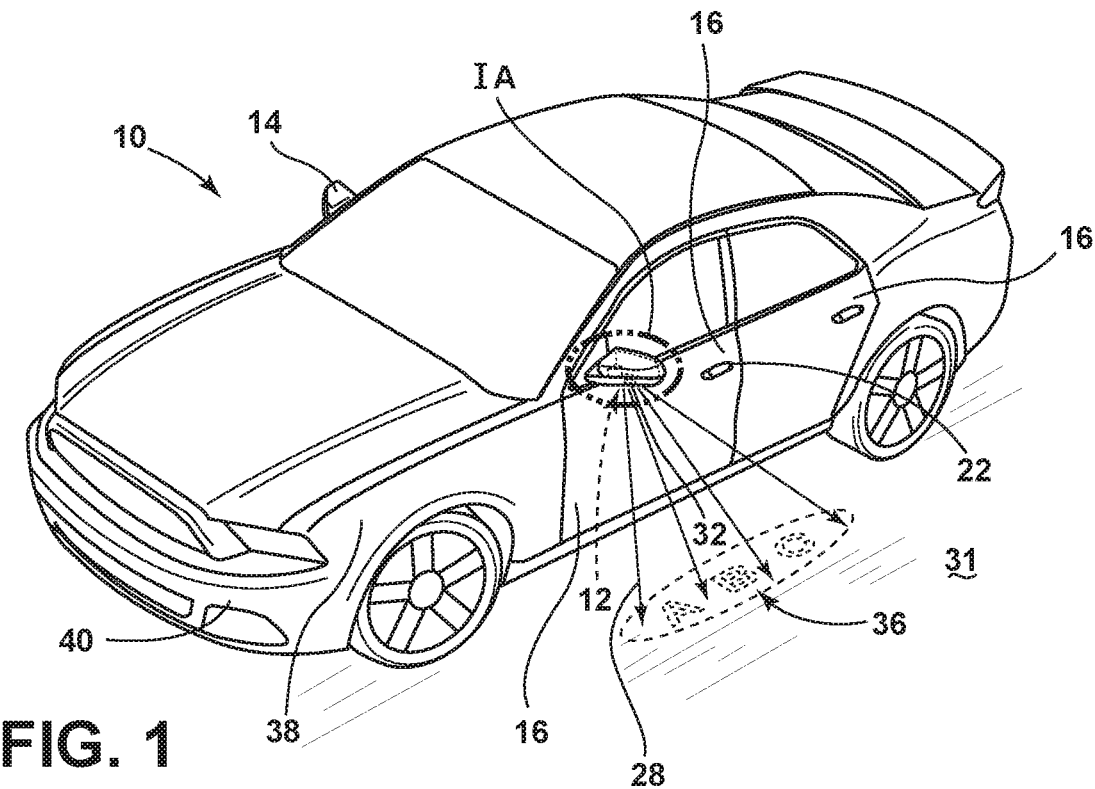
FIG. 1 is a front perspective view of an automotive vehicle employing a puddle lamp assembly in an exterior member of a vehicle, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a puddle lamp assembly that may be integrated into a support member of a vehicle. The support member may further house one or more sensor assemblies and/or a mirror. In some examples, the vehicle puddle lamp assembly may include a housing having a housing retainer configured to couple with the support member. A light source is supported by the housing. A cover is removably coupled to the housing. An optical member is disposed between the housing and the cover. The optical member may include an image filter thereon. The image filter is configured to form a desired image pattern on a surface proximate the housing, such as a ground surface. The cover may be removed so that the optical member may be interchangeably replaced with each having various image filters. Thus, a user may easily change the image pattern displayed proximate their vehicle.

Figure 1A:
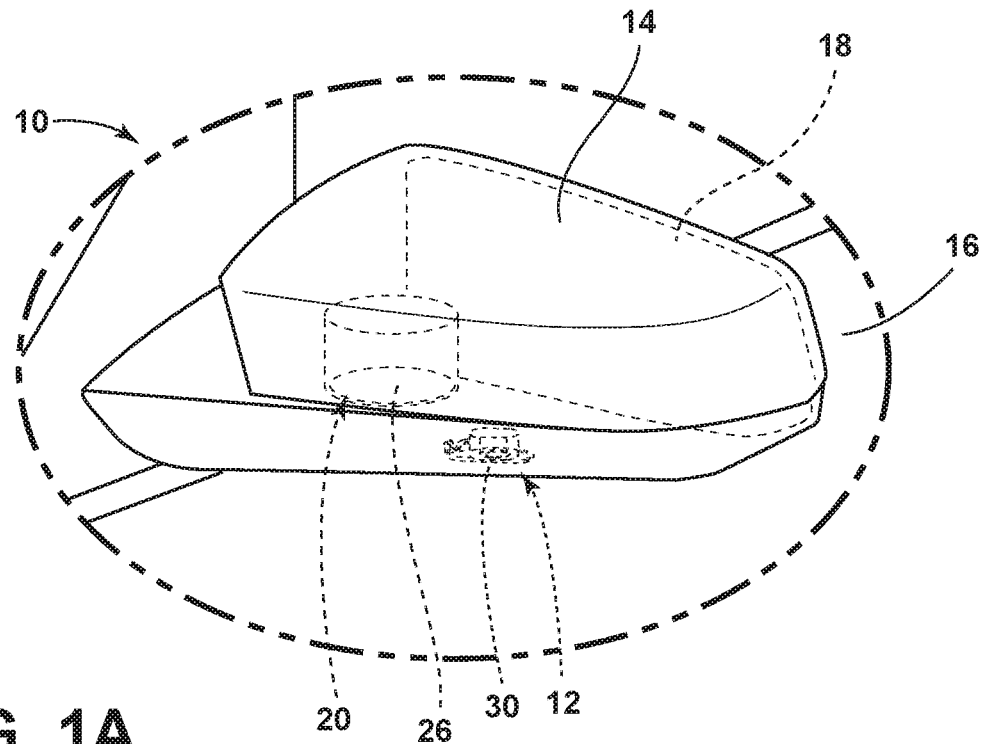
FIG. 1A is an enhanced view of section IA of FIG. 1 illustrating the exterior member with the puddle lamp assembly therein.

Referring to FIGS. 1 and 1A, a vehicle 10 is generally illustrated employing a puddle lamp assembly 12, according to some examples. The vehicle 10 shown is one example of a passenger vehicle 10 having a pair of exterior support members 14 mounted on opposing lateral sides of the vehicle 10 generally near the front side of the front passenger doors 16, which may be configured to house a mirror 18 and/or a sensor assembly 20 therein for detecting nearby objects. The passenger doors 16 each include a handle 22 with a latch mechanism to enable a user to engage and unlatch the latch mechanism to open the door 16 for access to a passenger compartment. The handle 22 may include a proximity sensor, such as a capacitive sensor, for detecting the hand of the user in close proximity to the handle 22. However, in some examples, the latch may be a mechanical latch and/or any other type of latch known in the art. In the depicted example, the vehicle 10 is illustrated as a sedan, but it will be understood that the vehicle 10 may be a truck, van, sport utility vehicle, or any other type of vehicle 10 without departing from the scope of teachings provided herein.

With further reference to FIGS. 1 and 1A, the vehicle 10 may be a manually operated vehicle (i.e. using a human driver) or may be autonomously driven by an onboard controller. Additionally, or alternatively, the vehicle 10 may be remotely controlled (e.g., via an operator in a different location). Autonomous vehicles sense the environment around them using a variety of sensors. In autonomous examples, the sensor assembly 20 may incorporate a light detection and ranging (LIDAR) system 26 that measures distance by illuminating a target with laser light. Such laser light may exist in the near-infrared and/or infrared wavelength band of the electromagnetic spectrum. The sensor assembly 20 may additionally, and/or alternatively, include any other type of sensor for detecting objects proximate the vehicle 10, including but not limited to, proximity sensors and/or imaging sensors.

The lamp assembly 12 may be installed within the exterior member 14, generally in a position configured to project light 28 towards a ground surface 31 proximate the vehicle 10 from one or more light sources 30. Moreover, the lamp assembly 12 may include an optical member 32 (FIG. 3) having a filter 34 (FIG. 3) thereon for generating an image pattern 36 on the ground surface 31. The filter 34 may be optically coupled with the one or more light sources 30. In some examples, the filter 34 and/or the optical member 32 may be removably disposed within the lamp assembly 12 such that the image pattern 36 may be selectively altered based on the desires of the user of the vehicle. It will further be appreciated that the lamp assembly 12 may be located on any portion of the vehicle 10, such as in the vehicle door handle 22, the door 16 itself, a side fender 38, a bumper 40, a roof rail or other locations sufficient to project light 28 towards a desired location without departing from the scope of the present disclosure.

Figure 3:
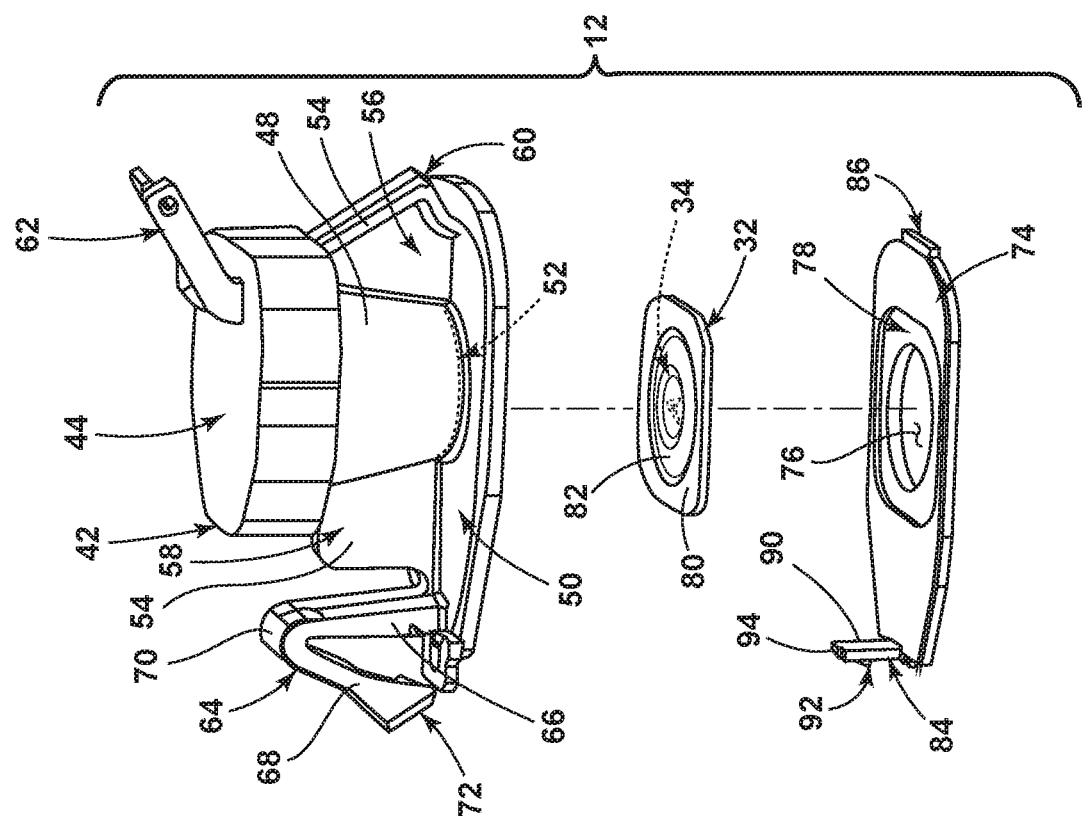
FIG. 3 is a side exploded view of the puddle lamp assembly, according to some examples, having a housing, an optical member, and a cover.
Figure 2:
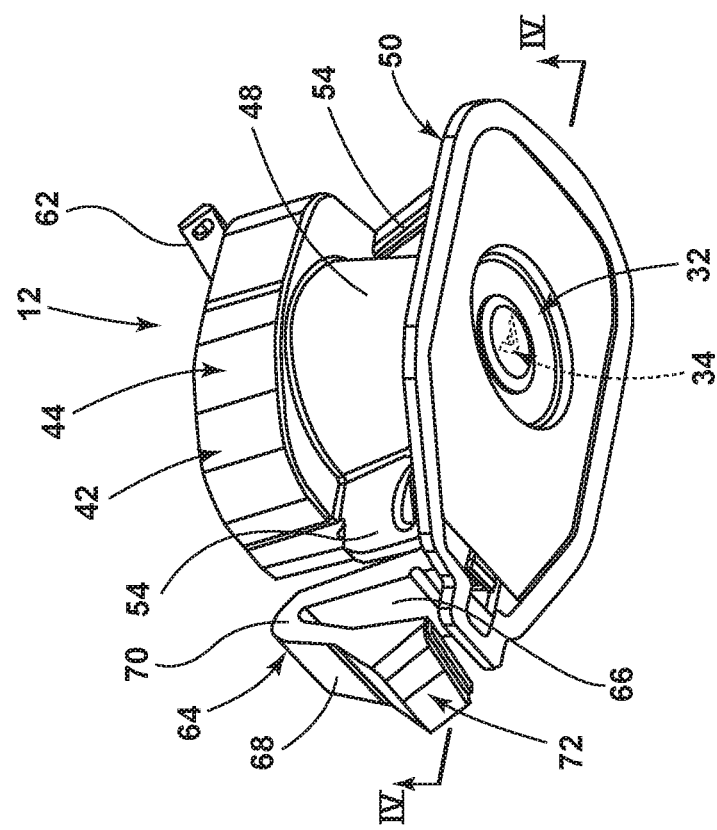
FIG. 2 is a bottom perspective view of the puddle lamp assembly, according to some examples.

Referring to FIGS. 2 and 3, the puddle lamp assembly 12, according to some examples, includes a housing 42 for being attached to the support member 14. The housing 42 may include a top portion 44 that houses the one or more light sources 30 and/or a circuit board 46 (FIG. 4). It will be appreciated that the lamp assembly 12 may be oriented in any direction and that the top portion 44 may be in any relationship to the remaining portions of the housing 42 and/or proximate vehicle components without departing from the scope of the present disclosure. A reflector 48 may include a body that extends from the top portion 44 to a base portion 50 of the housing 42 and directs light 28 emitted from the one or more light sources 30 through an aperture 52 defined by the base portion 50 of the housing 42. A support 54 may extend between the base portion 50 and the top portion 44 of the housing 42. In some examples, the support 54 may have a first portion 56 disposed on a first side of the reflector 48 and a second portion 58 disposed on a second, opposing side of the reflector 48.

In some examples, the housing 42 may be removably coupled to the support member 14, and/or any other portion of the vehicle 10. In some instances, a pivot portion 60 may be disposed on a first side portion of the housing 42 that may be initially inserted into a void within the support member 14. The pivot portion 60 may be integrally formed with the first portion 56 of the support 54. When inserting the pivot portion 60 into the support member 14, a power terminal 62 may be operably coupled with a power source of the vehicle 10 for providing electrical power to the lamp assembly 12. The housing 42 may then be rotated such that a housing retainer 64 on an opposing side portion of the housing 42 from the pivot portion 60 maintains the housing 42 within the support member 14. It will be appreciated that, in some examples, the housing 42 may include more than one housing retainer 64 without departing from the scope of the present disclosure. In instances where the housing 42 includes more than one housing retainer 64, each housing retainer 64 may include any feature described herein. Moreover, in some instances, the housing 42 may not include a pivot portion 60 and may be selectively retained by the housing 42 and/or the one or more housing retainers 64.

As illustrated in FIGS. 2 and 3, the housing retainer 64 may be resiliently deformable and may include first and second arms 66, 68 separated by a transition portion. The first arm 66 may extend from the base portion 50 of the housing 42 and terminates in the transition portion 70. The second arm 68 may extend in an offset direction from the transition portion 70. Moreover, the second arm 68 may be configured to engage with the support member 14 for removably maintaining the lamp assembly 12 within the void of the support member 14. Accordingly, the second arm 68 may also function as an engagement member while disposed within the support member 14. An end portion of the second arm 68 may include an angled, or chamfered, portion 72 that assists in deforming the housing retainer 64 while inserting the housing retainer 64 into the void.

A cover 74 is operably, and/or removably, coupled with the housing 42. In some examples, the optical member 32 is disposed between the cover 74 and the housing 42. Accordingly, the optical member 32 may be removed by separating the cover 74 from the housing 42. In some examples, the cover 74 may define a light output window 76 and a channel 78 surrounding the light output window 76. The optical member 32 includes a rim portion 80 that may be partially and/or fully surrounded by the channel 78 defined by the cover 74. An optical portion 82 covers at least a portion of the light output window 76 and creates a desired image pattern 36 to emanate from the housing 42.

With reference to FIGS. 3-7, the cover 74 may include a cover retainer 84 and a locator 86 on opposing side portions thereof. The locator 86 may be integrally formed with the cover 74 and/or be disposed within a locating slot 88 defined by the housing 42. The cover retainer 84 may include first and second legs 90, 92 that are operably coupled to a transition portion 94. However, it will be appreciated that the housing 42 and the cover 74 may include any other type of retainer without departing from the scope of the present disclosure. The cover retainer 84 may operably couple with the housing 42 and, in some examples, may be disposed within the first arm 66 of the housing retainer 64.

Referring to FIGS. 4 and 4A, a cavity 96 defined by the first arm 66 of the housing 42 may accept the cover retainer 84, or a portion thereof. The cavity 96 may be larger than the cover retainer 84 such that a release portion 98 on the second leg 92 may be grasped and/or otherwise used to move the second leg 92 towards the first leg 90. When the second leg 92 is moved towards the first leg 90, the cover 74 may be released from the housing 42 and the cover 74 and optical member 32 disposed thereon may be removed. The optical member 32 may be selectively changed to any desired optics and/or design and the cover retainer 84 may be reattached to the housing 42.

In some examples, the first arm 66 may define a protrusion 99 that extends into the cavity 96. The protrusion 99 may include a chamfered bottom surface and a planar top surface. The second leg 92 of the cover retainer 84 may define an extension 100 having a top chamfered surface and a planar bottom surface. The planar top surface of the protrusion 99 may interact with the planar bottom surface of the extension 100 to maintain the cover retainer 84 within the cavity 96. Moreover, the first leg 90 of the cover retainer 84 may contact a wall opposite the protrusion 99 to limit deflection of the first leg 90 away from the protrusion 99. Accordingly, the extension 100 may maintain contact with the protrusion 99 to assist in preventing inadvertent removal of the cover 74 from the housing 42.

With further reference to FIG. 4, the housing 42 supports the circuit board 46, which may be configured as a printed circuit board (PCB), having control circuitry 102 including drive circuitry for controlling activation and deactivation of the one or more light sources 30. The circuit board 46 may be any type of circuit board including, but not limited to, any flexible PCB and/or rigid PCB.

The circuit board 46 is operably coupled with a controller 104 that is configured to receive various inputs and control the puddle lamp assembly 12 by applying signals to the one or more light sources 30 within the puddle lamp assembly 12. The controller 104 may be disposed within the puddle lamp assembly 12 and/or within the vehicle 10. The inputs to the controller 104 may include a door position signal, a sensor signal, a door unlatch signal, a switch activation signal, and/or any other signal. The controller 104 may include any combination of software and/or processing circuitry suitable for controlling the various components of the puddle lamp assembly 12 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

The power terminal 62 is provided on the circuit board 46 and may pass through a seal for electrical connection with a corresponding receptacle within the support member 14 and/or the vehicle 10. In some examples, the power terminal 62 may be surrounded by a connector shell that is molded in conjunction with any other portion of the puddle lamp assembly 12, such as the housing 42.

With respect to the examples described herein, the light sources 30 may each be configured to emit visible and/or non-visible light 28, such as blue light, UV light, infrared, and/or violet light and may include any form of light source. For example, the light sources 30 may be fluorescent lights, light emitting diodes (LEDs), organic LEDs (OLEDs), polymer LEDs (PLEDs), laser diodes, quantum dot LEDs (QD-LEDs), solid-state lights, a hybrid of these or any other similar device, and/or any other form of light source. Further, various types of LEDs are suitable for use as the light source 30 including, but not limited to, top-emitting LEDs, side-emitting LEDs, and others. Moreover, according to various examples, multicolored light sources, such as Red, Green, and Blue (RGB) LEDs that employ red, green, and blue LED packaging may be used to generate various desired colors of light output from a single light source, according to known light color mixing techniques.

The optical member 32 is disposed in between the cover 74 and the housing 42. In some instances, the optical member 32 contacts the housing 42 and the cover 74 on opposing sides thereof to maintain the optical member 32 in a substantially constant position. Moreover, the optical member 32 and/or the cover 74 may also isolate various components of the puddle lamp assembly 12 from external contaminants and weather. The optical portion 82 may be operably coupled with the one or more light sources 30. For example, the optical portion 82 may be configured with a Fresnel lens, a pillow optic, and/or any other type of lens or optic that is configured to disperse, concentrate, and/or otherwise direct light 28 emitted from the puddle lamp assembly 12 therethrough in any desired manner. The optical member 32 may further include the image filter 34 on the optical portion 82 of the optical member 32 such that light 28 output by the light sources 30 passes through the image filter 34 to provide the lighted image patterns 36 projecting onto the ground surface 31. The image filters 34 may include a light transparent film having either a positive or a negative light transparent image. Additionally, and/or alternatively, the image filters 34 may be printed or otherwise disposed on the optical portion 82. As provided herein, the optical member 32 may be removed and changed from the puddle lamp assembly 12 such that a wide array of image patterns 36 may be generated.

In some instances, the optical member 32 and/or the cover 74 may include a decorative layer 106 thereon. The decorative layer 106 is configured to control or modify an appearance of the puddle lamp assembly 12 and/or generate variously colored image patterns 36. In various examples, the decorative layer 106 may confer a plurality of various patterns, textures, colors, etc. to various portions of the puddle lamp assembly 12. The decorative layer 106 can be disposed on an interior and/or an exterior surface of the optical member 32 and/or the cover 74 through any method known in the art, including, but not limited to, sputter deposition, vacuum deposition (vacuum evaporation coating), electroplating, and/or printing onto the film. The decorative layer 106 may be chosen from a wide range of materials and/or colors, including, but not limited to, silver, chrome, copper, bronze, gold, or any other colored surface. Additionally, an imitator of any metallic material may also be utilized without departing from the teachings provided herein. In various examples, the decorative layer 106 may have a textured or grained surface. The grained surface may be produced on various portions of the optical member 32 and/or the cover 74 to have a varied or common appearance with proximately disposed components of the vehicle 10.

According to some examples, the grain pattern may be produced by laser etching, or any other method known in the art.

Figure 5:
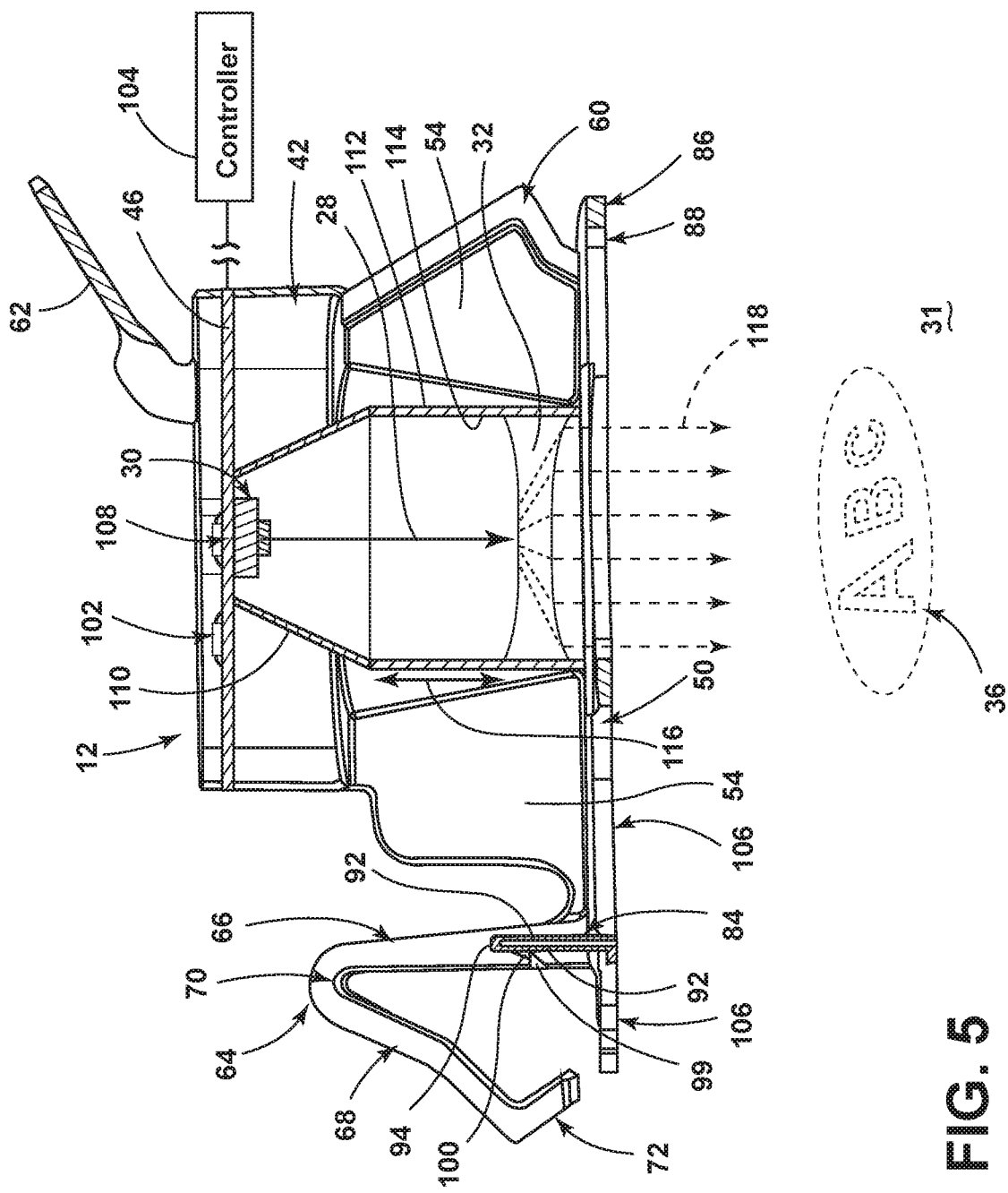
FIG. 5 is a cross-sectional view of the lamp assembly taken along the line IV-IV of FIG. 2 with the lamp assembly employing a projector lamp.

Referring to FIG. 5, the lamp assembly 12 may include one or more projector lamp 108. The projector lamp 108 may produce the image pattern 36 on the ground surface 31. The image pattern 36 may include messages, notifications, alerts, emblems, and/or any other desired design, as provided herein. The projector includes the light source 30, the optical member 32, a connector casing 110, and an enclosure 112. However, any other type of projector known in the art may be utilized. According to various examples, the projector lamp 108 may include more than one light source 30 forming a single light source unit for providing an image pattern 36 through multiple light beams 28. In addition, the light source 30 can be replaced by different light sources 30 having different color characteristics, wavelength, intensity, etc., enabling the possibility of a broad range of variations in image patterns 36, eventually aiming to enhance visual appeal to a viewer.

The optical member 32 may be configured to be housed within the enclosure 112, which may be integrally formed with the casing 110 and accessible by removing the cover 74. Further, an inner wall 114 of the enclosure 112 may include tracks or rails over which the optical member 32 can travel back and forth in the direction of the arrow 116 shown in FIG. 5. It is understood that such travel or movability, in relation to the light source 30, is configured to vary the size of the image pattern 36. Particularly, such movability enabled through the tracks or rails allows focusing the image pattern 36 on the ground surface 31 as well.

The light 28 emitted from the light source 30 can be a monochromatic beam of light, such as a laser, and accordingly, the light 28 can be a laser beam, configured to deliver a specific wavelength of visible light. This wavelength establishes a laser's color, as seen by the eye, by emitting light 28 in a beam. Furthermore, the laser adopted in the projector lamp 108 may be modulated for human viewing and application, particularly having no or negligible effects to those who may view the light 28. In other examples, any other type of light source may be utilized, including red, blue, and green packaged LEDs.

The optical member 32 may be an interchangeable lens, and can accordingly be at least one of a concave lens, convex lens, cylindrical lens, or an impression or projection specific lens, depending upon the usability and application. Particularly, lenses, such as the optical member 32 may enable one to attain images, messages, curves, etc., projected onto a surface, such as the ground surface 31. In addition, the optical member 32 may include a Fresnel lens composed of a number of small lenses arranged to make a lightweight lens of large diameter and short focal length suitable to be employed for projections according to the examples of the present disclosure.

During an operation of the projector lamp 108, the light source 30 emits light 28. The light 28 reaches the optical member 32. Subsequently, the optical member 32, receiving the light 28, refracts the light 28, causing the beam to form refracted rays 118, while enabling the light 28 to travel either in its original direction, or deflect, based according to the beam's angle of incidence on the optical member 32. The optical member 32 having the image filter 34 of at least an image, message, curve, etc., causes the refracted rays 118 to carry the design of the image filter 34 towards the ground surface 31, thereby forming the image pattern 36.

Figure 6:
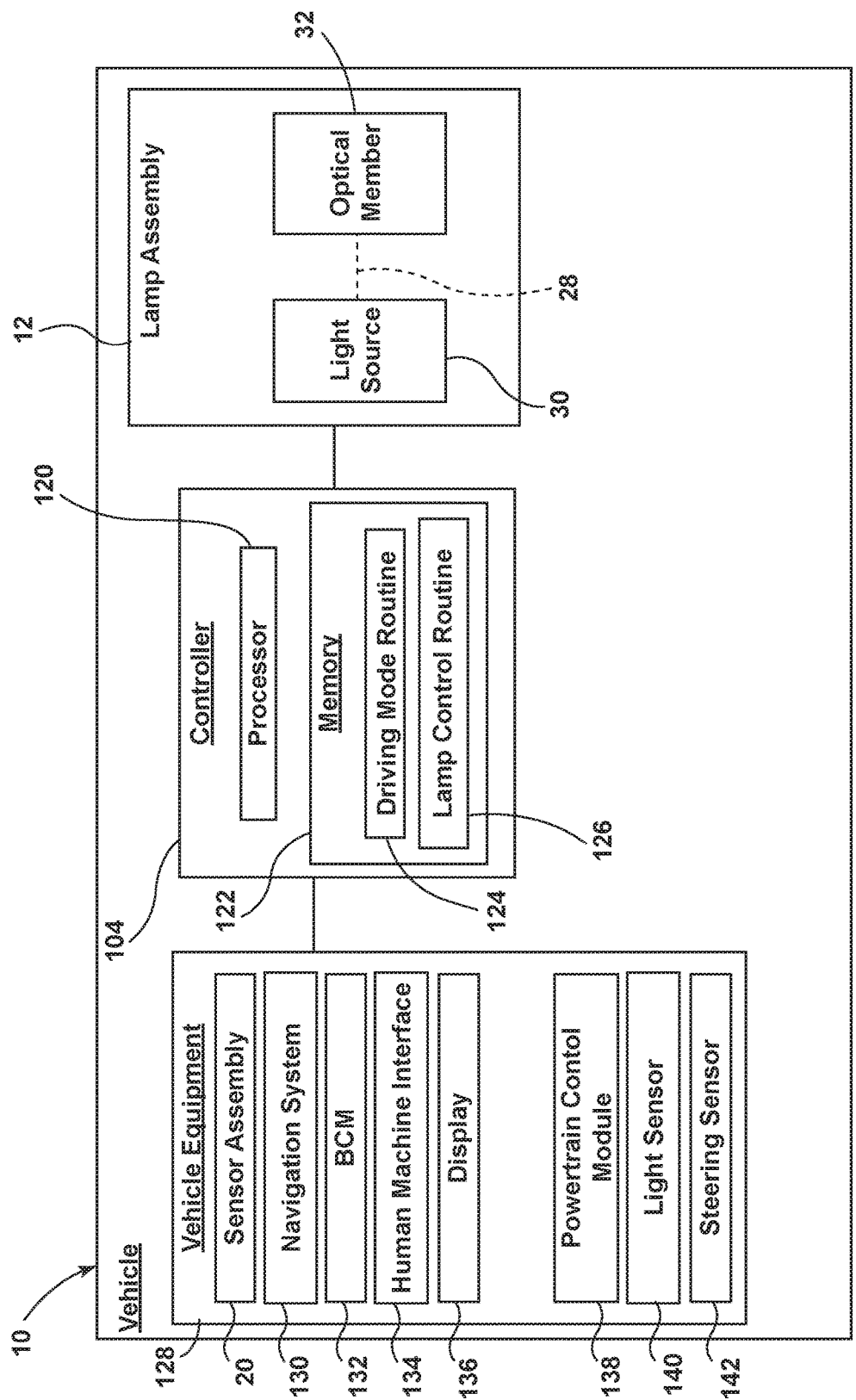
FIG. 6 is a block diagram of the vehicle incorporating the puddle lamp assembly, according to some examples.

Referring to FIG. 6, the vehicle 10 may be a manually operated vehicle (i.e. using a human driver) or may be autonomously driven by an onboard controller 104. Additionally, or alternatively, the vehicle 10 may be remotely controlled (e.g., via an operator located in a different location). The vehicle 10 generally includes the controller 104 having a processor 120 and a memory 122, the memory 122 including one or more forms of computer-readable media, and storing instructions executable by the processor 120 for performing various operations. The controller 104 may be a dedicated or shared controller and may include the processor 120 and memory 122, according to some examples. It should be appreciated that the controller 104 may include control circuitry such as analog and/or digital control circuitry. The memory 122 may include one or more routines, such as a driving mode routine 124 and/or a lamp control routine 126. According to some examples, the driving mode routine 124 may determine whether the vehicle 10 is being operated in under an autonomous mode and/or a manual mode. The lamp control routine 126 may illuminate the light source 30 based on various inputs.

With continued reference to FIG. 6, the controller 104 may communicate with the vehicle equipment 128 to receive information and illuminate the puddle lamp assembly 12 based on the information. In the depicted examples, the vehicle equipment 128 includes the sensor assembly 20, a navigation system 130, a body control module (BCM) 132, a human-machine interface (HMI) 134, a display 136, a powertrain control module (PCM) 138, a light sensor 140, and/or a steering sensor 142, each of which provides information to the controller 104 that may be used to determine the operation of the lamp assembly 12. For example, the navigation system 130 may provide the controller 104 with information related to the progress of a trip (e.g., ETA, distance, etc.). The navigation system 130 may also cooperate with the lamp assembly 12 such that the lamp assembly 12 is illuminated as the vehicle 10 begins to operate and/or move in an autonomous mode. The BCM 132 and/or PCM 138 may provide the controller 104 with information related to the vehicle 10 such as a door status (e.g., locked/unlocked), a seat belt status (e.g., buckled/unbuckled), a vehicle speed, etc. to determine whether a person is disposed within the vehicle 10 and/or operating (or capable of operating) the vehicle 10.

With further reference to FIG. 6, the vehicle 10 may additionally include the HMI 134 that may be used for controlling a plurality of functions within the vehicle 10, including, but not limited to, air conditioning settings, seat settings, sound settings, and/or navigational settings. The HMI 134 may also include a display 136 that may provide any desired information about the settings and/or any other information about the vehicle 10. The display 136 may also provide any desired information about the lamp assembly 12.

In some examples, the vehicle 10 includes a light sensor 140 that may be utilized for varying the intensity of light 28 emitted from the lamp assembly 12. The light sensor 140 detects the environmental lighting conditions, such as whether the vehicle 10 is in day-like conditions (i.e., higher light level conditions) and/or whether the vehicle 10 is in night-like conditions (i.e., lower light level conditions). The light sensor 140 can be of any suitable type and can detect the day-like and night-like conditions in any suitable fashion. According to some examples, the colors of light and/or intensities of light emitted from the lamp assembly 12 may be varied based on the detected conditions. Moreover, the light source 30 may be activated in low-light conditions and when the vehicle 10 is operating in a mode that is indicated by the lamp assembly 12, such as an autonomous mode. The light sensor 140 may be integrated into the vehicle 10 or into the lamp assembly 12. Moreover, the intensity of emitted light may additionally, or alternatively, be varied with the initiation of the vehicle's headlights.

Referring still to FIG. 6, the lamp assembly 12 may include one or more light sources 30 that are operably coupled with the optical member 32 to generate a desired image pattern 36. The image pattern 36 may be any desired pattern that is to be illuminated on a panel on the vehicle 10 and/or on the ground surface 31 proximate the vehicle 10 when the puddle lamp assembly 12 is activated. As provided herein, a wide array of image filters 34 may be interchangeably used within the puddle lamp assembly 12 to generate various image patterns 36.

A variety of advantages may be derived from the use of the present disclosure. For example, use of the disclosed puddle lamp assembly projects an array of individualized image patterns proximate the vehicle. Moreover, various image filters may easily be disposed within the puddle lamp assembly such that the image patterns may be changed/updated at any time by a user. The puddle lamp assembly may be disposed in an exterior panel of the vehicle so that the image pattern is visible as an occupant approaches the vehicle, and/or during any other desired time. The puddle lamp assembly may be manufactured at low costs when compared to standard vehicle lighting assemblies.

According to various examples, a vehicle puddle lamp assembly is provided herein. The vehicle puddle lamp assembly includes a housing having a housing retainer. A light source is supported by the housing. A cover is removably coupled to a base portion of the housing. An optical member is disposed between the housing and the cover. Examples of the vehicle puddle lamp assembly can include any one or a combination of the following features:
- the housing includes a pivot portion on an opposing side of the housing from the housing retainer;
- a reflector including a body that extends from a top portion to a base portion of the housing;
- a cover retainer configured to couple the cover to the housing, the cover retainer having first and second legs separated by a transition portion;
- the cover includes a locator disposed on an opposing end portion of the cover from the cover retainer;
- the housing retainer includes resiliently deformable first and second arms separated by a transition portion;
- the cover includes a cover retainer having at least one leg, the at least one leg extending into a cavity defined by a first arm;
- the first arm includes a protrusion and the at least one leg includes an extension, the protrusion and extension configured to contact one another to maintain the coupling of the cover to the housing;
- the cover defines a light output window and a channel surrounding the light output window;
- the optical member defines a rim portion that is disposed within the channel and an optical portion that provides the desired image pattern to emanate from the housing;
- the optical member includes an image filter thereon, the image filter configured to form a desired image pattern on a surface proximate the housing; and/or
- the light source is configured as a projector lamp and the optical member is movable within the housing.

Moreover, a method of manufacturing a vehicle puddle lamp assembly is provided herein. The method includes forming a housing having a housing retainer. The method also includes supporting a light source within the housing. The method further includes removably coupling a cover to a base portion of the housing. Lastly, the method includes positioning an optical member between the housing and the cover.

According to some examples, a vehicle puddle lamp assembly is provided herein. The vehicle puddle lamp assembly includes a housing having a housing retainer. A light source is supported by the housing. A cover is removably coupled to the housing. The cover includes a cover retainer that is operably coupled to the housing retainer. Examples of the vehicle puddle lamp assembly can include any one or a combination of the following features:
- an optical member disposed between the housing and the cover;
- the cover retainer is disposed within at least a portion of the housing retainer; and/or
- the optical member includes an image filter thereon, the image filter configured to form a desired image pattern on a surface proximate the housing.

According to some examples, a vehicle puddle lamp assembly is provided herein. The vehicle puddle lamp assembly includes a housing having a housing retainer and supporting a light source. A cover is removably coupled to the housing. The cover includes a cover retainer at least partially disposed within the housing retainer. An optical member is disposed between the housing and the cover. Examples of the vehicle puddle lamp assembly can include any one or a combination of the following features:
- the housing retainer defines a cavity on the cover retainer that is at least partially disposed within the cavity;
- a protrusion extending from the housing into the cavity; and an extension protruding from the cover retainer, wherein the extension contacts the protrusion to retain the cover in relation to the housing; and/or
- the optical member includes an image filter thereon, the image filter configured to form a desired image pattern on a surface proximate the housing.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory, other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor and/or switch examples discussed above might include computer hardware, software, firmware, or any combination thereof to perform at least a portion of their functions. For example, a sensor and/or switch may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle puddle lamp assembly comprising:
   a housing having a top portion, a base portion, and a housing retainer, the housing retainer including a first arm extending from the base portion towards the top portion and a second arm extending from a transition portion in an offset direction away from the housing;
   a light source positioned within the top portion;
   a cover removably coupled to the base portion of the housing, wherein the cover includes a cover retainer that extends into an interior cavity of the first arm and includes a release disposed externally of the interior cavity; and
   an optical member disposed within a channel defined by the cover.

2. The vehicle puddle lamp assembly of claim 1, wherein the housing includes a pivot portion on an opposing side of the housing from the housing retainer.

3. The vehicle puddle lamp assembly of claim 1, further comprising:
   a reflector including a body that extends from a top portion to a base portion of the housing.

4. The vehicle puddle lamp assembly of claim 1, further comprising:
   a cover retainer configured to couple the cover to the housing, the cover retainer having first and second legs separated by a transition portion.

5. The vehicle puddle lamp assembly of claim 4, wherein the cover includes a locator disposed on an opposing end portion of the cover from the cover retainer.

6. The vehicle puddle lamp assembly of claim 1, wherein the first and second arms are resiliently deformable.

7. The vehicle puddle lamp assembly of claim 1, wherein the cover includes a cover retainer having at least one leg, the at least one leg extending into a cavity defined by a first arm.

8. The vehicle puddle lamp assembly of claim 7, wherein the first arm includes a protrusion and the at least one leg includes an extension, the protrusion and extension configured to contact one another to maintain the coupling of the cover to the housing.

9. The vehicle puddle lamp assembly of claim 1, wherein the cover defines a light output window and a channel surrounding the light output window.

10. The vehicle puddle lamp assembly of claim 9, wherein the optical member defines a rim portion that is disposed within the channel and an optical portion that provides the desired image pattern to emanate from the housing.

11. The vehicle puddle lamp assembly of claim 1, wherein the optical member includes an image filter thereon, the image filter configured to form a desired image pattern on a surface proximate the housing.

12. The vehicle puddle lamp assembly of claim 1, wherein the light source is configured as a projector lamp and the optical member is movable within the housing.

13. A vehicle puddle lamp assembly comprising:
    a housing having a housing retainer, the housing retainer including a first arm retained within a void defined by an exterior member of a vehicle;
    a light source supported by the housing; and
    a cover removably coupled to the housing, the cover including a cover retainer that extends from the cover into an interior cavity of the first arm and including a release disposed externally of the interior cavity.

14. The vehicle puddle lamp assembly of claim 13, further comprising:
    an optical member disposed between the housing and the cover.

15. The vehicle puddle lamp assembly of claim 13, wherein the cover retainer is disposed within at least a portion of the housing retainer.

16. The vehicle puddle lamp assembly of claim 14, wherein the optical member includes an image filter thereon, the image filter configured to form a desired image pattern on a surface proximate the housing.

17. A vehicle puddle lamp assembly comprising:
    a housing rotatably coupled to a support member of a vehicle via a housing retainer, wherein the housing retainer includes a first arm defining an interior cavity;
    a light source supported by the housing;
    a cover defining a light output window and a channel surrounding the light output window, wherein the cover is removably coupled to the housing via a cover retainer that extends into the interior cavity of the first arm; and
    an optical member disposed within the channel, the light source configured to emit light through the optical member and the light output window.

18. The vehicle puddle lamp assembly of claim 17, wherein the housing retainer defines a cavity on the cover retainer that is at least partially disposed within the cavity.

19. The vehicle puddle lamp assembly of claim 18, further comprising:
    a protrusion extending from the housing into the cavity; and
    an extension protruding from the cover retainer, wherein the extension contacts the protrusion to retain the cover in relation to the housing.

20. The vehicle puddle lamp assembly of claim 17, wherein the optical member includes an image filter thereon, the image filter configured to form a desired image pattern on a surface proximate the housing.

* * * * *